(12) United States Patent
Serizawa et al.

(10) Patent No.: US 7,859,213 B2
(45) Date of Patent: Dec. 28, 2010

(54) CONTROL DEVICE AND CONTROL METHOD

(75) Inventors: Akira Serizawa, Makinohara (JP); Byungeok Seo, Makinohara (JP); Hiroo Yabe, Makinohara (JP)

(73) Assignee: Yazaki Corporation, Tokyo (JP)

( * ) Notice: Subject to any disclaimer, the term of this patent is extended or adjusted under 35 U.S.C. 154(b) by 407 days.

(21) Appl. No.: 12/120,317

(22) Filed: May 14, 2008

(65) Prior Publication Data

US 2008/0315815 A1  Dec. 25, 2008

(30) Foreign Application Priority Data

Jun. 21, 2007  (JP) .............................. 2007-163727

(51) Int. Cl.
*H02H 7/00* (2006.01)
(52) U.S. Cl. ........................ 318/454; 318/453; 318/452; 318/458; 318/459; 318/471; 318/472; 361/23; 361/89; 361/25; 361/26; 363/23; 363/25; 363/28
(58) Field of Classification Search .................. 318/453, 318/452, 458, 454, 459, 471, 472; 361/23, 361/89, 25, 26; 363/23, 25, 26, 28
See application file for complete search history.

(56) References Cited

U.S. PATENT DOCUMENTS

| | | | | |
|---|---|---|---|---|
| 5,652,525 | A | * | 7/1997 | Mullin et al. ................ 324/772 |
| 6,016,965 | A | * | 1/2000 | Yoshimura et al. ............ 236/35 |
| 6,339,310 | B1 | * | 1/2002 | Sugiyama et al. ............ 318/783 |
| 6,392,376 | B1 | * | 5/2002 | Kobayashi et al. ........... 318/471 |
| 6,747,432 | B2 | * | 6/2004 | Yoshimura .................. 318/599 |
| 7,347,167 | B2 | * | 3/2008 | Sugiyama et al. .......... 123/41.11 |
| 2004/0008457 | A1 | * | 1/2004 | Iimura et al. ................... 361/18 |
| 2005/0046379 | A1 | * | 3/2005 | Suzuki et al. ................ 318/712 |

FOREIGN PATENT DOCUMENTS

| | | |
|---|---|---|
| DE | 10232166 A1 | 2/2004 |
| DE | 102005050741 A1 | 4/2007 |
| JP | 10-8959 A | 1/1998 |

OTHER PUBLICATIONS

Office Action dated Jun. 11, 2010, issued in counterpart German Application No. 10 2008 027 743.6-32.

* cited by examiner

*Primary Examiner*—Rita Leykin
(74) *Attorney, Agent, or Firm*—Sughrue Mion, PLLC

(57) ABSTRACT

A control device for controlling a recovery from a locking of a motor includes: a switching unit which supplies a motor current from a current supplying unit to the motor; and a driving control unit which supplies a PWM control signal to the switching unit to control a driving of the switching unit. The driving control unit supplies the PWM control signal with a low duty ratio lower than a regular duty ratio to the switching unit when the locking of the motor is detected depending on a variation in temperature of the switching unit. The driving control unit supplies the PWM control signal with the regular duty ratio to the switching unit when a cancel of the locking of the motor is detected depending on a variation in inter-terminal voltage of the motor.

12 Claims, 7 Drawing Sheets

- 113a: INTERLAYER INSULATING FILM
- 112d: THICK OXIDE FILM
- 112c: WELL LAYER (P LAYER)
- 112b: EPITAXIAL LAYER
- 112a: SUBSTRATE LAYER

FIG. 3A
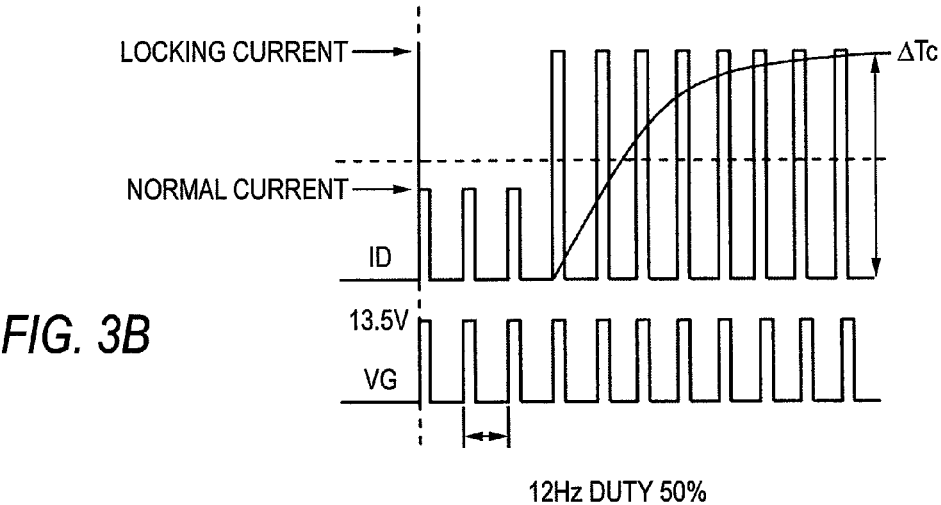
FIG. 3B
12Hz DUTY 50%
FIG. 3C
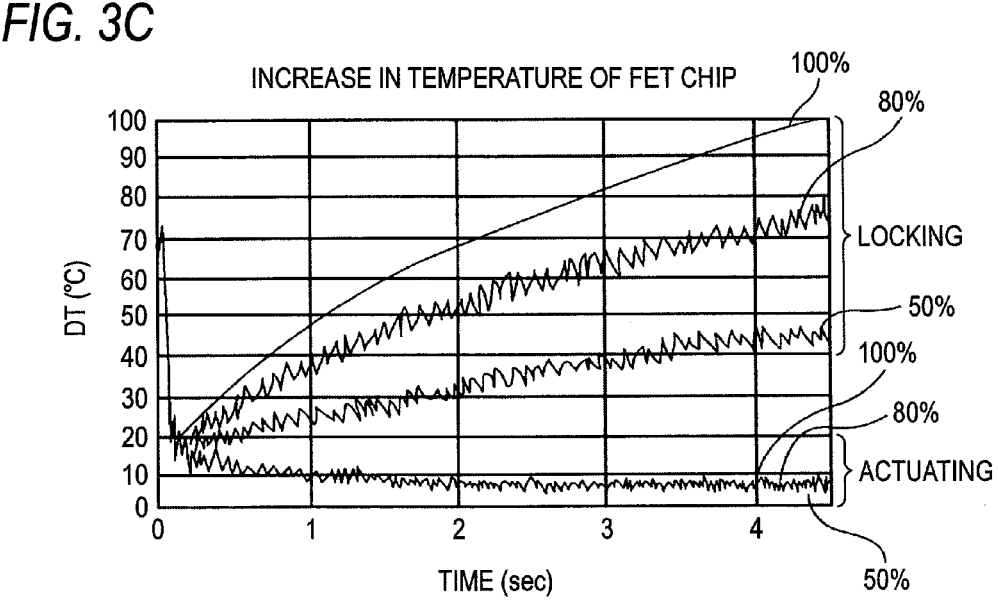

CONTROL DEVICE AND CONTROL METHOD

BACKGROUND OF THE INVENTION

1. Technical Field

The present invention relates to controlling a fan motor for driving a cooling fan mounted on a vehicle, and more particularly, to a control device and a control method that can control at the locking of a fan motor and control at the cancel of the locking of the fan motor.

2. Background Art

For example, an electric fan for a vehicle mounted on a vehicle having an AC (air-conditioner) built therein is used to cool a coolant flowing in an AC capacitor or a radiator by actuating two cooling fans. In such an electric fan for a vehicle, when a coolant temperature is higher than a predetermined temperature, the coolant temperature can be kept constant by turning on a relay to supply power to a fan motor for driving the cooling fan and controlling the ON/OFF of the relay.

In such an electric fan for a vehicle, for example, the cooling fan may be clogged with foreign particles and thus the fan motor may be locked. In this case, when the foreign particles are removed but the cooling fan is not driven as soon as the fan motor could be unlocked, the overheating may be caused for a short time.

As a structure for controlling the electric fan for a vehicle, JP-A-10-8959 suggests an electric fan device that includes a signal processing circuit for outputting a pulse signal for executing a PWM control process on the basis of a coolant temperature control signal from an engine control ECU, a driving circuit for amplifying the pulse signal to drive a MOS transistor for driving two electric motors in common, a smoothing circuit provided to prevent the occurrence of conductive noises at the time of switching the MOS transistor, an over-current protecting circuit restricting a motor current when any one electric motor is locked, a motor voltage detecting circuit for detecting a motor-applied voltage applied to the electric motors, and a transmitting circuit for supplying a clock signal to the signal processing circuit.

In JP-A-10-8959, since two electric motors are controlled in a PWM manner by the MOS transistor driving two electric motors in common, the structure of the electric fan device is simpler than a structure for individually controlling two electric motors.

In that when the locking of one of two electric motors is detected, the motor current is restricted by the over-current protecting circuit and the electric motor that is not locked is actuated to cool the engine, some cooling ability is secured.

Since the electric fan device includes a signal processing circuit outputting a pulse signal for executing a PWM control process on the basis of a coolant temperature control signal from an engine control ECU, a driving circuit amplifying the pulse signal to drive a MOS transistor for driving two electric motors in common, a smoothing circuit provided to prevent the occurrence of conductive noises at the time of switching the MOS transistor, an over-current protecting circuit restricting a motor current when any one electric motor is locked, a motor voltage detecting circuit detecting a motor-applied voltage applied to the electric motors, and a transmitting circuit supplying a clock signal to the signal processing circuit, there is a problem with an increase in size of the device.

In the electric fan device, when any one electric motor is locked, the electric motor not locked is actuated. Accordingly, there is also a problem that the unlocked electric motor could not return to a normal state as soon as the locked electric motor is unlocked.

SUMMARY OF THE INVENTION

The invention is contrived in view of the above-mentioned situations. An object of the invention is to provide a control device and a control method that can solve the above-mentioned problems.

According to an aspect of the present invention, there is provided a control device for controlling a recovery from a locking of a motor, including: a switching unit which supplies a motor current from a current supplying unit to the motor; and a driving control unit which supplies a PWM control signal to the switching unit to control a driving of the switching unit, wherein the driving control unit supplies the PWM control signal with a low duty ratio lower than a regular duty ratio to the switching unit when the locking of the motor is detected depending on a variation in temperature of the switching unit; and wherein the driving control unit supplies the PWM control signal with the regular duty ratio to the switching unit when a cancel of the locking of the motor is detected depending on a variation in inter-terminal voltage of the motor.

Preferably, the switching unit includes: a switching element that is turned on/off in response to the PWM control signal and that supplies the motor current to the motor; and a thermo-sensor that detects a temperature of the switching unit, wherein the driving control unit includes: a voltage measuring section that measures the inter-terminal voltage of the motor; a gate drive section that supplies the PWM control signal to the gate of the switching element; and a temperature variation detecting section that detects a variation in temperature on the basis of the temperature detected by the thermo-sensor, wherein the gate drive section supplies the PWM control signal with the low duty ratio when the temperature variation detecting section detects that the variation in temperature per unit time is greater than a threshold value; and wherein the gate drive section supplies the PWM control signal with the regular duty ratio when the voltage measuring section measures the variation in voltage of the motor.

Here, it is preferable that the gate driving section stops to supply the PWM control signal with the low duty ratio when the temperature variation detection section detects that the variation in temperature is greater than a first predetermined value; and wherein the gate driving section resumes to supply the PWM control signal with the low duty ratio when the temperature variation detection section detects that the variation in temperature is lowered to a second predetermined value lower than the first predetermined value.

According to an aspect of the present invention, there is provided a control device for controlling a recovery from a locking of a first motor and a second motor, including: a first switching unit which supplies a motor current from a current supplying unit to the first motor and the second motor on the basis of a PWM control signal; a second switching unit which turns on/off the first motor and the second motor on the basis of an ON/OFF signal; an overheating interrupting unit which detects a temperature of the second switching unit to output the OFF signal for turning off the first motor and the second motor when the detected temperature is greater than a predetermined value; and a driving control unit which supplies the PWM control signal to control a driving of the first switching unit and supplies the ON/OFF signal to control a driving of the second switching unit, and supplies the OFF signal to the second switching unit when receiving the OFF signal from the overheating interrupting unit, wherein the driving control unit supplies the PWM control signal with a low duty ratio lower than a regular duty ratio to the first switching unit when at least one of the locking of the first motor and the second motor is detected depending on a variation in temperature of the first switching unit; and wherein the driving control unit supplies the PWM control signal with the regular duty ratio to the first switching unit when a cancel of the locking of the at least one of the first motor and the second motor is detected depending on a variation in inter-terminal voltage of the at least one of the first motor and the second motor.

Preferably, the first switching unit includes: a first switching element that is turned on/off in response to the PWM control signal and that supplies the motor current; and a first thermo-sensor that detects a temperature of the first switching unit, wherein the second switching unit includes: a second switching element that is turned on/off in response to the ON/OFF signal and that turns off the first motor and the second motor when turned off; and a second thermo-sensor that detects a temperature of the second switching unit, wherein the driving control unit includes: a voltage measuring section that measures inter-terminal voltages of the first motor and the second motor; a gate drive section that supplies the PWM control signal to the gate of the first switching element and the ON/OFF signal to the second switching element; and a temperature variation detecting section that detects a variation in temperature on the basis of the temperature detected by the first thermo-sensor, and wherein the gate drive section supplies the PWM control signal with the low duty ratio when the temperature variation detecting section detects that the variation in temperature per unit time is greater than a threshold value; and wherein the gate drive section supplies the PWM control signal with the regular duty ratio when the voltage measuring section measures the variation in voltage of at least one of the first motor and the second motor.

Here, it is preferable that the gate driving section stops to supply the PWM control signal with the low duty ratio when the temperature variation detection section detects that the variation in the temperature detected by the first thermo-sensor is greater than a first predetermined value; and wherein the gate driving section resumes to supply the PWM control signal with the low duty ratio when the temperature variation detection section detects that the variation in the temperature detected by the first thermo-sensor is lowered to a second predetermined value lower than the first predetermined value.

According to an aspect of the present invention, there is provided a control method of controlling a recovery from a locking of a motor, the control method including: supplying a motor current from a current supplying unit to the motor via a switching unit; supplying a PWM control signal to the switching unit to control a driving of the switching unit; supplying the PWM control signal with a low duty ratio lower than a regular duty ratio to the switching unit when the locking of the motor is detected depending on a variation in temperature of the switching unit; and supplying the PWM control signal in the regular duty ratio to the switching unit when a cancel of the locking of the motor is detected depending on a variation in inter-terminal voltage of the motor.

Preferably, the supplying process of the motor current is performed by a switching element in accordance with the PWM control signal, the control method, further comprising: detecting a temperature of the switching unit; measuring an inter-terminal voltage of the motor; supplying the PWM control signal to the gate of the switching element; detecting a variation in temperature on the basis of the temperature detected in the detecting process of the temperature; supplying the PWM control signal in the low duty ratio when it is detected that the variation in temperature per unit time is greater than a threshold value; and supplying the PWM control signal in the regular duty ratio when the variation in voltage of the motor is detected.

Here, it is preferable that the control method includes: stopping the supply of the PWM control signal in the low duty ratio when the variation in the temperature is greater than a first predetermined value; and resuming the supply of the PWM control signal in the low duty ratio when the variation in the temperature is lowered to a second predetermined value lower than the first predetermined value.

According to an aspect of the present invention, there is provided a control method of controlling a recovery from a locking of a first motor and a second motor, the control method including: supplying a motor current from a current supplying unit to the first motor and the second motor on the basis of a PWM control signal via a first switching unit; turning on/off the first motor and the second motor on the basis of an ON/OFF signal via a second switching unit; detecting a temperature of the second switching unit; outputting a signal for turning off the first motor and the second motor when the detected temperature of the second switching unit is greater than a predetermined value; controlling the driving of the first switching unit in response to the PWM control signal; controlling the driving of the second switching unit in response to the ON/OFF signal; supplying the OFF signal to the second switching unit when the OFF signal is received; supplying the PWM control signal in a low duty ratio lower than a regular duty ratio to the first switching unit when the locking of at least one of the first motor and the second motor is detected depending on a variation in temperature of the first switching unit; and supplying the PWM control signal in the regular duty ratio to the first switching unit when a cancel of the locking of the at least one of the first motor and the second motor is detected depending on a variation in inter-terminal voltage of at least one of the first motor and the second motor.

Preferably, the supplying process of the motor current is performed by a first switching element turned on/off in accordance with the PWM control signal; and wherein the turning on/off process of the first motor and the second motor is performed by a second switching element turned on/off in accordance with the ON/OFF signal, the control method, further including: detecting a temperature of the first switching unit; detecting a temperature of the second switching unit, measuring inter-terminal voltages of the first motor and the second motor; supplying the PWM control signal to the gate of the first switching element; supplying the ON/OFF signal to the second switching element; detecting a variation in the temperature of the first switching unit; supplying the PWM control signal in the low duty ratio when it is detected that the variation in the inner temperature per unit time is greater than a threshold value; and supplying the PWM control signal in the regular duty ratio when the variation in voltage of at least one of the first motor and the second motor is detected.

Here, it is preferable that the control method includes: stopping the supply of the PWM control signal of the low duty ratio when the variation in the temperature of the first switching unit is greater than a first predetermined value; and resuming the supply of the PWM control signal of the low duty ratio when the variation in the temperature of the first switching unit is lowered to a second predetermined value lower than the first predetermined value.

In the control device and the control method according to the invention, the driving control section detects the locking of the motor depending on a variation in temperature of the switching section, drives the motor at low duty ratio by the use of the switching section when it is locked, detects the cancel of the locking depending on a variation in inter-terminal voltage of the electric fan motor, and drives the motor at regular duty ratio by the use of the switching section when it is unlocked. Accordingly, the motor can be continued to be driven at the low duty ratio lower than the regular duty ratio when the motor is locked and the motor can be made to return to the regular duty ratio when the motor is unlocked.

In the control device and the control method according to the invention, since the motor can be continued to be driven at the low duty ratio lower than the regular duty ratio when the motor is locked and the motor can be made to return to the regular duty ratio when the motor is unlocked, it is possible to allow the motor to return to the normal state with a simple configuration as soon as the motor is unlocked.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein:

FIGS. 3A, 3B and 3C are diagrams illustrating a detection characteristic of a locking current of a switching element shown in FIG. 1;

DETAILED DESCRIPTION OF THE PREFERRED EMBODIMENTS

In this embodiment, by allowing switching section to supply the motor current from a battery to an electric fan motor, allowing driving control section to control the driving of the switching section in response to a predetermined PWM control signal, and changing the duty ratio of the PWM control signal depending on a variation in temperature of the switching section and a variation in inter-terminal voltage of the electric fan motor, the electric fan motor can be continued to be driven at the low duty ratio lower than the predetermined (regular) duty ratio when the electric fan motor is locked and the electric fan motor can be made to return to the predetermined duty ratio when the electric fan motor is unlocked.

In this case, the switching section includes a MOS switching element that is turned on/off in response to the PWM control signal and that supplies the motor current and a thermo-sensor that detects an inner temperature, the driving control section includes a voltage measuring circuit that measures the inter-terminal voltage of the electric fan motor, a gate drive circuit that supplies the PWM control signal to the gate of the switching element, and a temperature variation detecting circuit that detects a variation in temperature on the basis of the temperature detected by the thermo-sensor. The PWM control signal from the gate drive circuit has low duty ratio lower than predetermined duty ratio when the temperature variation detecting circuit detects that the variation in temperature per unit time is greater than a threshold value, and the PWM control signal from the gate drive circuit returns to the predetermined duty ratio when the voltage measuring circuit detects that the variation in voltage of the electric fan motor is less than a predetermined threshold value. Accordingly, it is possible to allow the electric fan motor to return to a normal state with a simple configuration as soon as the electric fan motor is unlocked.

Embodiment

Figure 1:
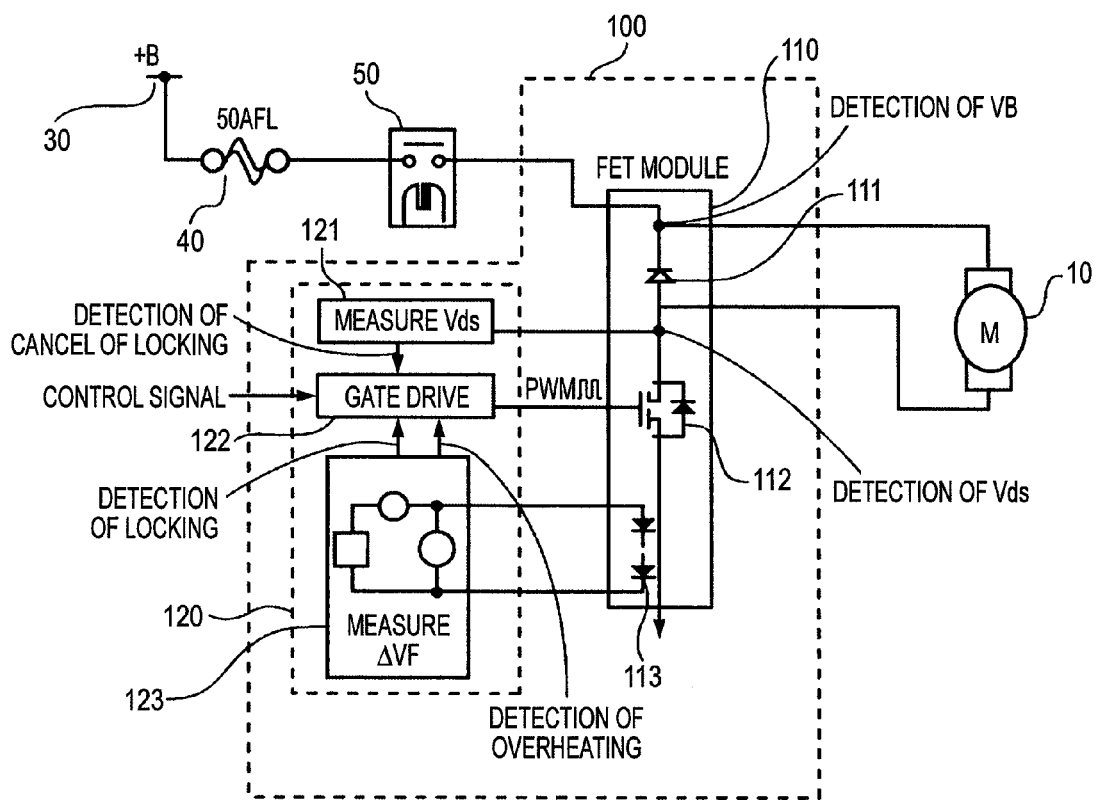
FIG. 1 is a diagram illustrating a control device according to an embodiment of the invention.

Hereinafter, an embodiment of the invention will be described in detail. FIG. 1 is a diagram illustrating a control device according to an embodiment of the invention.

A control device 100 shown in the figure controls an electric fan motor 10 for driving a cooling fan cooling a radiator not shown in a PWM manner and includes a switching circuit 110 and a driving control circuit 120. In the figure, reference numeral 30 represents a battery, reference numeral 40 represents a fuse, and reference numeral 50 represents an electric fan motor relay.

The switching circuit 110 includes diode 111 for absorbing a back electromotive force, a MOS switching element 112 that is turned on/off in response to a PWM control signal and that supplies a motor current from the battery 30 to the electric fan motor 10, and a thermo-sensor 113 including a temperature sensing diode for detecting a junction temperature of the switching element 112. Here, the thermo-sensor 113 is a diode integrated on the switching element 112 and a forward voltage (VF) thereof decreases with an increase in junction temperature of the switching element 112. A structure and a temperature detecting characteristic are described later.

The driving control circuit 120 includes a drain-source voltage (Vds) measuring circuit 121 for measuring a drain-source voltage (Vds) of the switching element 112, that is, an inter-terminal voltage of the electric fan motor 10, a gate drive circuit 122 for supplying an ON/OFF gate pulse (PWM signal) to the gate of the switching element 112 on the basis of a control signal from an engine control ECU not shown, and a temperature variation detecting circuit 123 for detecting a variation in temperature ($\Delta Tc/dt$) from a variation in anode-cathode voltage (VF) of the thermo-sensor 113.

Here, the drain-source voltage (Vds) measuring circuit 121 detects the cancel of the locking of the electric fan motor 10 by sensing a voltage in a period where the switching element 112 is turned off, that is, (VB−Vds), as described later.

The temperature variation detecting circuit 123 detects the locking of the electric fan motor 10 and detects the overheating of the switching circuit 110 in accordance with the detection of the variation in temperature ($\Delta Tc/dt$). When the temperature variation detecting circuit 123 detects the locking of the electric fan motor 10, the gate drive circuit 122 is driven at low duty ratio as described later.

When the temperature variation detecting circuit 123 detects the overheating, the temperature variation detecting circuit 123 stops the driving of the gate drive circuit 122 to interrupt the overheating. When the temperature variation detecting circuit 123 detects the overheating, for example, a threshold value corresponding to 145° C. is set as a first predetermined value and the interruption of the overheating is made before the temperature is not higher than the junction temperature (Tj=150° C.) of the switching element 112.

The process after the overheating detection is classified into the following two cases.

1) Case where the Overheating is Detected During the Locking

When the overheating is detected during the low duty ratio control due to the detection of the locking, the interruption of the overheating is automatically released and the interruption of overheating and the low-duty ratio control are cyclically retried. Specifically, when the overheating is detected, the gate of the switching element 112 is turned off to interrupt the overheating. However, when a value lower by, for example, 20° C. than a first predetermined value is set as a second predetermined value and the junction temperature of the switching element 112 is lowered to the second predetermined value, the interruption of the overheating is released and a later-described return condition from the locking of the electric fan motor 10 is waited for in a later-described low duty ratio control. When the overheating is detected again in the meantime, the re-interruption of the overheating is cyclically retried.

2) Case where the Overheating is Detected in a State Other than the Locking

When the overheating is detected, the gate of the switching element 112 is turned off to latch the interruption of the overheating. Since it is assumed that the overheating is detected from an abnormal state such as the short-circuit of the output in the state other than the locking, the interruption of the overheating is continued to be latched. The latching of the interruption of the overheating can be cleared by turning off an ignition key.

Figure 2A:
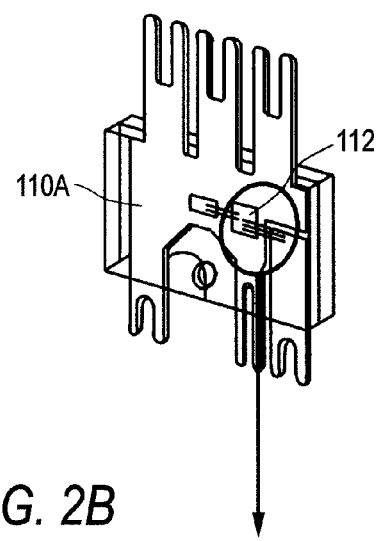
FIGS. 2A and 2B are diagrams illustrating a structure of a thermo-sensor shown in FIG. 1.
Figure 2B:
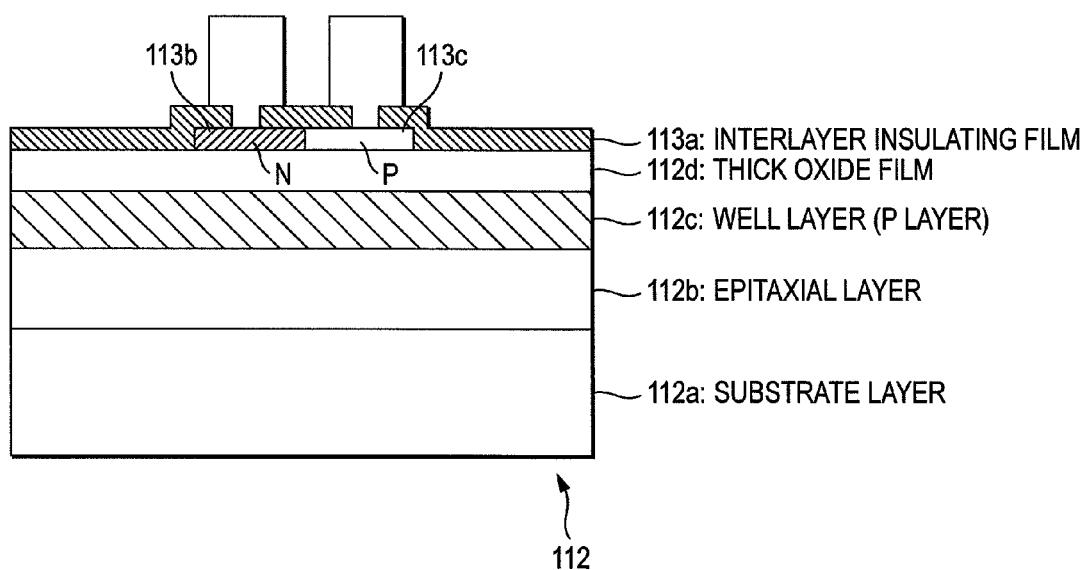
Figure 2C:
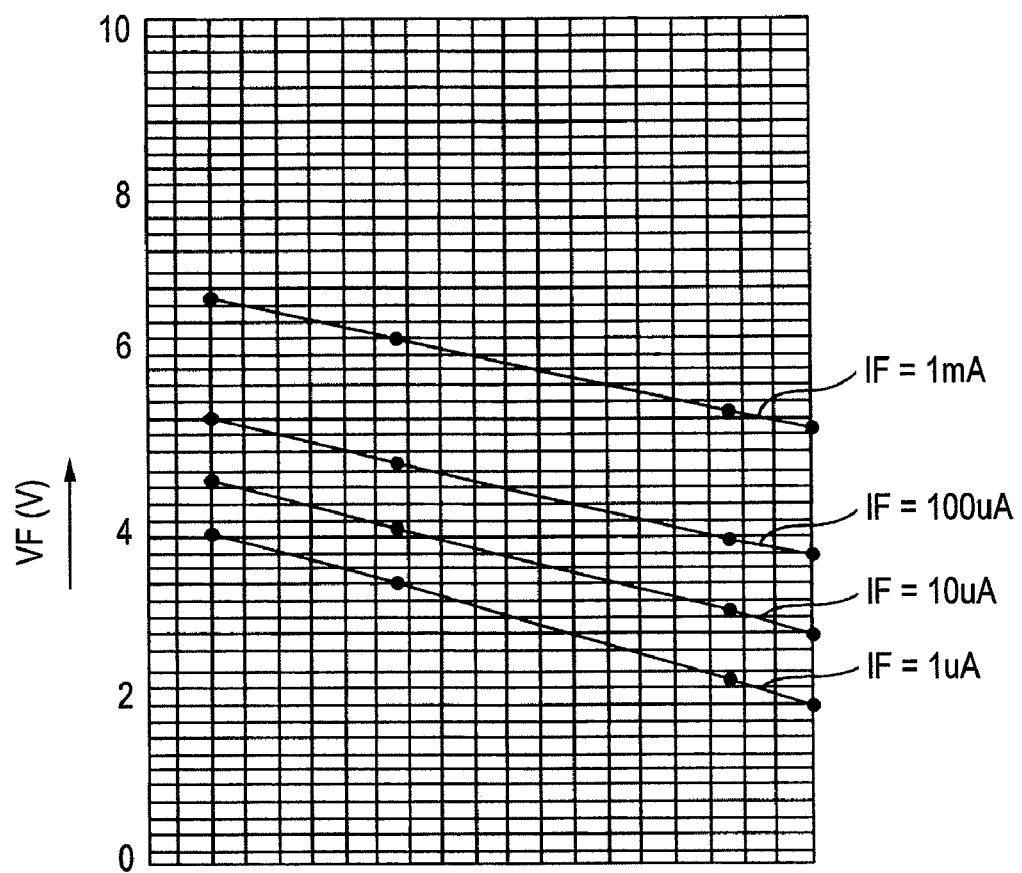
FIG. 2C is a diagram showing a temperature detecting characteristic thereof.

FIGS. 2A, 2B, and 2B are diagrams illustrating a structure and a temperature detecting characteristic of the thermo-sensor 113. Here, FIG. 2A shows the structure of the switching circuit 110, FIG. 2B shows a sectional structure of the switching element 112 on which the thermo-sensor 113 is integrated, and FIG. 2C shows the temperature detecting characteristic of the thermo-sensor 113.

First, the switching element 112 on which the thermo-sensor 113 is integrated is mounted on a flat component 110A as shown in FIG. 2A. As shown in FIG. 2B, the switching element 112 has a structure in which a substrate layer 112a, an epitaxial layer 112b, a well layer 112c, and an oxide film 112d are sequentially stacked. An interlayer insulating film 113a, an N layer 113b, and a P layer 113c constituting the thermo-sensor 113 are stacked on the oxide film 112d.

Here, since the plane of the thermo-sensor 113 is surrounded with elements of the switching element 112, the junction temperature of the switching element 112 can be detected right above the switching element 112.

The thermo-sensor 113 has a negative temperature coefficient. As shown in FIG. 2C, when the anode-cathode current (IF) is, for example, 1 μA, 10 μA, 100 μA, and 1 mA, it can be seen that the anode-cathode voltage (VF) decreases with the increase in temperature. In other words, by detecting the variation of the anode-cathode voltage (VF), it is possible to detect the variation in temperature.

That is, when the temperature of the junction (bonding portion) varies, the characteristic of the diode is assumed as a temperature coefficient of −2 mV/° C., and the forward voltage at 20° C. is about 0.6 V, the forward voltage (VF) of the thermo-sensor 113 as a diode is VF=(forward voltage at 20° C.: 0.6 V)+(−2 mV/° C.×temperature variation ° C.).

In addition, it is experimentally known that the temperature coefficient of the thermo-sensor 113 in which plural stages of diodes are connected in series is −8 mV/° C. By connecting the plural stages of diodes, it is possible to simplify the structure of the switching circuit 110 including the thermo-sensor 113 and the switching element 112.

FIGS. 3A, 3B and 3C are associated with sensing the locking of the electric fan motor 10 and are diagrams illustrating a locking current detecting characteristic in the switching element 112, for example, in 12 Hz PWM control. Here, FIGS. 3A and 3C are graphs in which the variation of the forward voltage (VF) of the thermo-sensor 113 at the time of locking the electric fan motor 10 is converted into the variation in temperature, and FIG. 3B shows a case where the duty ratio is 50% in the 12 Hz PWM control. 13.5 V shown in FIG. 3B represents the inter-terminal voltage at the time of actuating the electric fan motor 10.

First, when the electric fan motor 10 is locked, as shown in FIG. 3A, the locking current flows, the junction temperature of the switching element 112 increases with the increase in drain current (ID) of the switching element 112 and the temperature (ΔTc) detected by the thermo-sensor 113 also increases.

That is, as shown in FIG. 3C, in the 12 Hz PWM control, when the electric fan motor 10 is driven at one of duty ratio of 50%, 80%, and 100%, it can be seen that a rapid variation in temperature does not occur at any duty ratio of 50%, 80%, and 100% at the time of actuating the electric fan motor 10.

On the contrary, it can be seen that a rapid variation in temperature occurs in any duty ratio of 50%, 80%, and 100% at the time of locking the electric fan motor 10. Accordingly, the temperature (ΔTc) increases at any duty ratio of 50%, 80%, and 100%, the variation in temperature (ΔTc/dt) is detected by the temperature variation detecting circuit 123, and the locking of the electric fan motor 10 is detected when the variation in temperature (ΔTc/dt) is greater than a predetermined threshold value.

In this way, when the locking of the electric fan motor 10 is detected, the electric fan motor is continuously driven in a low heating state where the rapid variation in temperature does not occur, by turning on the switching element 112 with a pulse signal (gate voltage (VG)) at, e.g., 12 Hz and at duty ratio of 7%, which is lower than any duty ratio of 50%, 80%, and 100%, like the actuation of the electric fan motor 10. The duty ratio of 50%, 80%, and 100% is an example corresponding to a given value based on a control signal from an engine control ECU not shown and the invention is not limited to the duty ratio.

The duty ratio of 7% at the time of locking the electric fan motor 10 is set based on the condition that the electric fan motor 10 starts its actuation when the electric fan motor 10 is unlocked and the electromotive force of the electric fan motor 10 is equal to or less than a threshold value of a battery voltage (VB)×0.9 V. However, the duty ratio of 7% at the time of locking the electric fan motor 10 is not strict, but the duty ratio may be less than or greater than 7%.

Figure 4A:
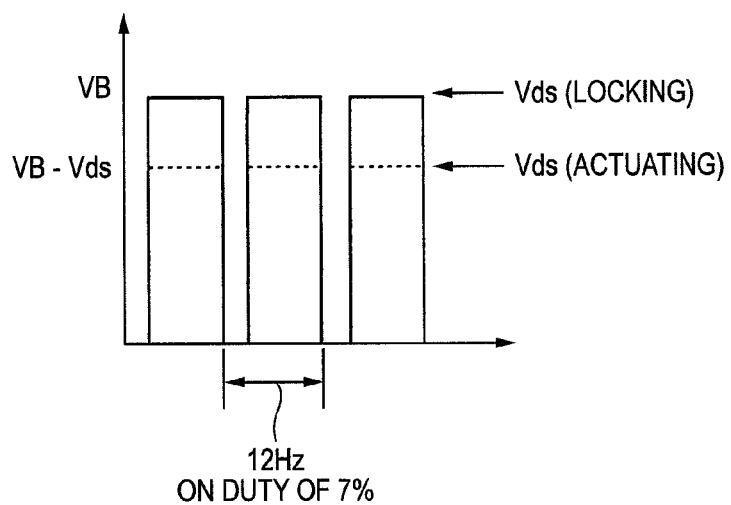
FIGS. 4A and 4B are diagrams illustrating a drain-source voltage (Vds) characteristic of the switching element at the time of driving and locking an electric fan motor shown in FIG. 1.
Figure 4B:
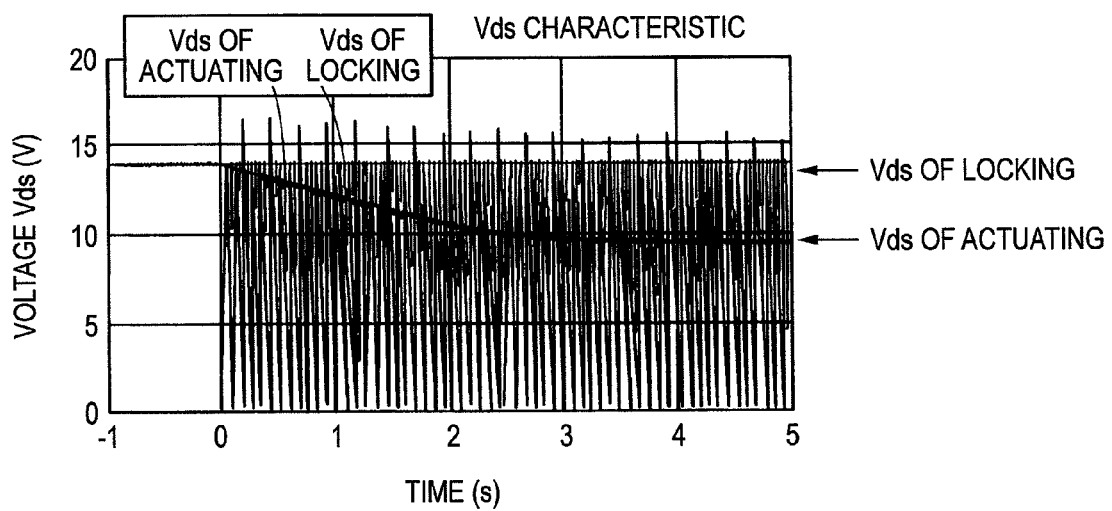

FIGS. 4A and 4B are associated with sensing the unlocking of the electric fan motor 10 and are diagrams illustrating a drain-source voltage (Vds) characteristic of the switching element 112 at the time of actuating and locking the electric fan motor 10 in the 12 Hz PWM control.

Here, in FIGS. 4A and 4B, the waveforms of the drain-source voltage (Vds) of the switching element 112 at the time of actuating and locking the electric fan motor 10 overlap with each other.

That is, as shown in FIG. 4A, the drain-source voltage (Vds) of the switching element 112 during the locking of the electric fan motor 10 becomes a voltage of a locking current as the drain current (ID) of the switching element 112×ROn (ON resistance of the switching element 112) in the period of 7% when the switching element 112 is turned on, and a voltage value of several hundred mV is output.

On the contrary, in the period when the switching element 112 is turned off, the battery voltage (VB) is output. Here, when the electric fan motor 10 is actuated, the voltage in the period when the switching element 112 is turned off varied. That is, the drain-source voltage (Vds) of the switching element 112 at the time of actuating the electric fan motor 10 is lower than the battery voltage (VB) by the electromotive force of the electric fan motor 10.

Accordingly, as shown in FIG. 4B, by detecting the voltage in the period when the switching element 112 is turned off, that is, (VB−Vds), it is possible to detect the unlocking of the electric fan motor 10.

Figure 5:
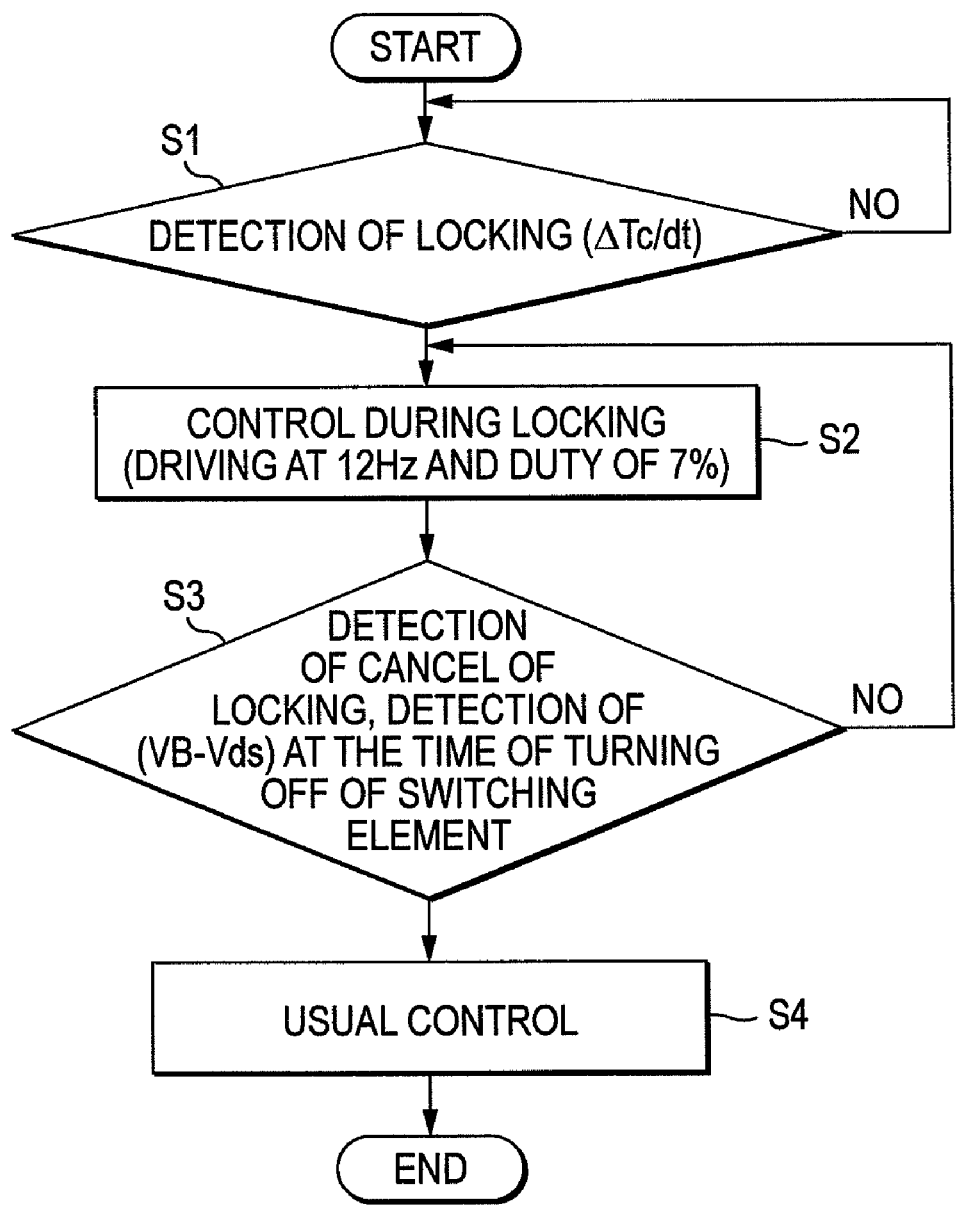
FIG. 5 is a flowchart illustrating a control method of the control device shown in FIG. 1.

A control method of the control device 100 is described now. First, as shown in FIG. 5, when the temperature variation detecting circuit 123 detects the variation in temperature (ΔTc/dt) and detects that the variation in temperature (ΔTc/dt) is greater than a predetermined threshold value, the locking of the electric fan motor 10 is detected (step S1).

When the locking is detected, the application of power to the electric fan motor 10 in the low heating state is continued by supplying a PWM control pulse signal of, for example, the duty ratio of 7% to the gate of the switching element 112 from the gate drive circuit 122 (step S2).

When the electric fan motor 10 is unlocked, the electric fan motor 10 is actuated and the unlocking of the electric fan motor 10 is detected by detecting (VB−Vds) at the time of turning off the switching element 112 (step S3).

After the unlocking of the electric fan motor 10 is detected, the usual control is executed by the use of the PWM control pulse signal supplied from the gate drive circuit 122 to the gate of the switching element 112 at the duty ratio based on the control signal from the engine control ECU not shown (step S4).

As described above, in this embodiment, by allowing the switching circuit 110 as the switching section to supply the motor current from the battery 30 to the electric fan motor 10, allowing the driving control circuit 120 as the driving control section to control the driving of the switching circuit 110 in response to a predetermined PWM control signal, and changing the duty ratio of the PWM control signal depending on a variation in temperature of the switching circuit 110 and a variation in inter-terminal voltage of the electric fan motor 10, the electric fan motor can be continued to be driven at the low duty ratio lower than the predetermined duty ratio when the electric fan motor 10 is locked and the electric fan motor can be made to return to the predetermined duty ratio when the electric fan motor 10 is unlocked.

Specifically, the switching circuit 110 includes a MOS switching element 112 that is turned on/off in response to the PWM control signal and that supplies the motor current and a thermo-sensor 113 that detects an inner temperature, the driving control circuit 120 includes a drain-source voltage (Vds) measuring circuit 121 as the voltage measuring section that measures the inter-terminal voltage of the electric fan motor 10, a gate drive circuit 122 that supplies the PWM control signal to the gate of the switching element 112, and a temperature variation detecting circuit 123 that detects a variation in temperature by the use of the thermo-sensor 113. The PWM control signal from the gate drive circuit 122 has low duty ratio lower than predetermined duty ratio when the temperature variation detecting circuit 123 detects that the variation in temperature per unit time is greater than a threshold value, and the PWM control signal from the gate drive circuit 122 returns to the predetermined duty ratio when the drain-source voltage (Vds) measuring circuit 121 detects that the variation in voltage of the electric fan motor 10 is less than a predetermined threshold value. Accordingly, it is possible to allow the electric fan motor 10 to return to a normal state with a simple configuration as soon as the electric fan motor 10 is unlocked.

Although it has been described in this embodiment that the control device 100 controls the electric fan motor 10 driving a cooling fan for cooling a radiator not shown in a PWM manner, the invention is not limited to the embodiment, but it may further control another electric fan motor driving a cooling fan for cooling an AC (air-conditioner) capacitor not shown.

The configuration in this case is described with reference to FIG. 6. In the below description with reference to the figure, the same elements as FIG. 1 are denoted by the same reference numerals.

Figure 6:
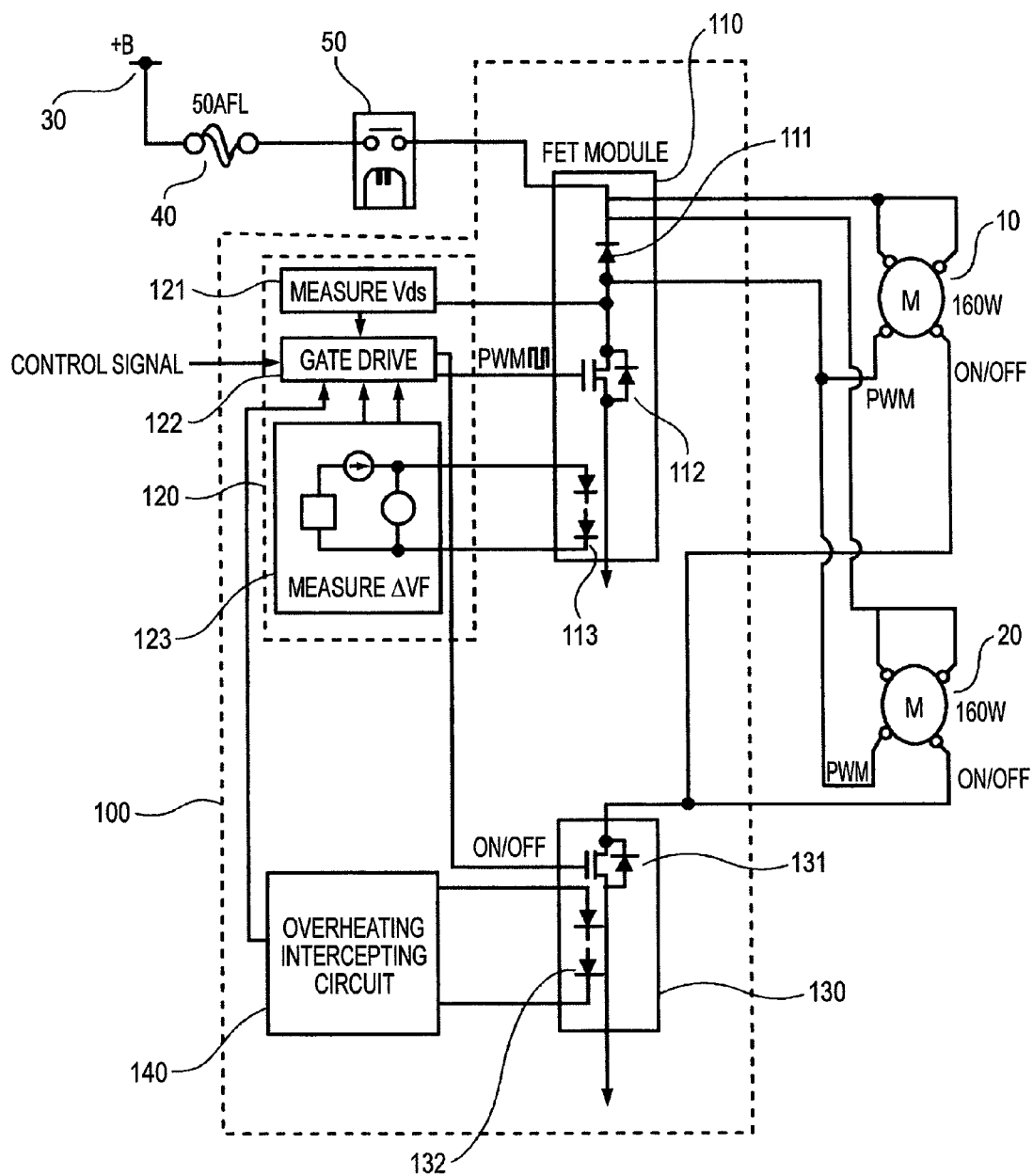
FIG. 6 is a diagram illustrating a modified configuration of the control device shown in FIG. 1.

That is, a control device 100 shown in FIG. 6 controls in a PWM manner an electric fan motor 10 as a first electric fan motor driving a cooling fan for cooling a radiator not shown and an electric fan motor 20 as a second electric fan motor driving a cooling fan for cooling an AC (air-conditioner) capacitor not shown, on the basis of the control signal from the engine control ECU not shown, and includes a switching circuit 110 as the first switching section, a driving control circuit 120 as the driving control section, a switching circuit 130 as the second switching section, and an overheating interrupting circuit 140 as the overheating interrupting unit. As described above, in the figure, reference numeral 30 represents a battery, reference numeral 40 represents a fuse, and reference numeral 50 represents an electric fan motor relay.

As described above, the switching circuit 110 includes a diode 111 for absorbing a back electromotive force, a switching element 112 as the first MOS switching element that is turned on/off in response to a PWM control signal and that supplies a motor current from the battery 30 to the electric fan motor 10 and the electric fan motor 20, and a thermo-sensor 113 as the first thermo-sensor including a temperature sensing diode for detecting a junction temperature (ambient temperature or inner semiconductor temperature) of the switching circuit 110.

As described above, the driving control circuit 120 includes a drain-source voltage (Vds) measuring circuit 121 as the voltage measuring section measuring an anode voltage (Vds) of the diode 111, that is, inter-terminal voltages of the electric fan motor 10 and the electric fan motor 20, a gate drive circuit 122 supplying an ON/OFF gate pulse (PWM signal) to the gate of the switching element 112 and an ON/OFF gate pulse to the gate of a switching element 131 to be described later, and a temperature variation detecting circuit 123 detecting a variation in temperature from a variation in anode-cathode voltage (VF) of the thermo-sensor 113.

The switching circuit 130 includes a switching element 131 as the second MOS switching element turning on/off the electric fan motor 10 and the electric fan motor 20 in response to an ON/OFF signal from the gate drive circuit 122 and a thermo-sensor 132 as the second thermo-sensor including a thermo-sensing diode for detecting an inner temperature of the switching circuit 130. Here, unlike the above-mentioned thermo-sensor 113, the thermo-sensor 132 only detects the overheating of the switching circuit 130 to turn off the gate of the switching element 131 by the use of the gate drive circuit 122. That is, the thermo-sensor 132 is a thyristor temperature sensor and performs a switching operation that is turned on at an overheating sensing temperature.

When the temperature detected from the anode-cathode voltage of the thermo-sensor 132 is greater than a predetermined threshold value, the overheating interrupting circuit 140 controls the gate drive circuit 122 to stop the driving of the electric fan motor 10 and the electric fan motor 20, thereby self-protecting the switching element 112. Accordingly, the threshold value needs to be set to a predetermined value lower than a rated value causing the meltdown of the fuse 40.

In this configuration, as described above, when the temperature variation detecting circuit 123 detects the variation in temperature ($\Delta Tc/dt$) and detects that the variation in temperature ($\Delta Tc/dt$) is greater than a predetermined threshold value, the locking of the electric fan motor 10 is detected. Here, when the locking is detected, the application of power to the electric fan motor 10 in the low heating state is continued by supplying a PWM control pulse signal of, for example, the duty ratio of 7% to the gate of the switching element 112 from the gate drive circuit 122, as describe above.

As described above, when the electric fan motor 10 is unlocked, the electric fan motor 10 is actuated and the unlocking of the electric fan motor 10 is detected by detecting (VB−Vds) at the time of turning off the switching element 112.

As described above, after the unlocking of the electric fan motor 10 is detected, the usual control is executed by the use of the PWM control pulse signal supplied from the gate drive circuit 122 to the gate of the switching element 112 at the duty ratio based on the control signal from the engine control ECU not shown.

That is, with the configuration shown in FIG. 6, the control of the locking of the electric fan motor 10 and the electric fan motor 20 and the control of the unlocking thereof can be executed by the driving control circuit 120. Accordingly, with a simple structure, it is possible to allow the electric fan motor 10 and/or the electric fan motor 20 to a normal state as soon as the electric fan motor 10 and/or the electric fan motor 20 is unlocked.

In the configuration shown in FIG. 6, when the temperature of the switching circuit 130 is detected by the thermo-sensor 132 and the detected temperature is greater than a predetermined value, the overheating interrupting circuit 140 outputs a signal for turning off the electric fan motor 10 and the electric fan motor 20. Then, since the driving of the electric fan motor 10 and the electric fan motor 20 is stopped by supplying an OFF signal from the gate drive circuit 122 to the gate of the switching element 131, it is possible to prevent the destruction of the switching element 112 or the meltdown of the fuse 40 at the time of locking the electric fan motor 10 and/or the electric fan motor 20. However, the destruction of the switching element 112 is prevented by the self-protection of the switching element 112 using the overheating interrupting circuit 140 and the meltdown of the fuse 40 is prevented by the driving control circuit 120.

The invention can be applied to controlling other motors other than the electric fan motor.

What is claimed is:

1. A control device for controlling a recovery from a locking of a motor, comprising:
   a switching unit which supplies a motor current from a current supplying unit to the motor; and
   a driving control unit which supplies a PWM control signal to the switching unit to control a driving of the switching unit,
   wherein the driving control unit supplies the PWM control signal with a low duty ratio lower than a regular duty ratio to the switching unit when the locking of the motor is detected depending on a variation in temperature of the switching unit; and
   wherein the driving control unit supplies the PWM control signal with the regular duty ratio to the switching unit when a cancel of the locking of the motor is detected depending on a variation in inter-terminal voltage of the motor.

2. The control device according to claim 1, wherein the switching unit includes:
   a switching element that is turned on/off in response to the PWM control signal and that supplies the motor current to the motor; and
   a thermo-sensor that detects a temperature of the switching unit,
   wherein the driving control unit includes:
      a voltage measuring section that measures the inter-terminal voltage of the motor;
      a gate drive section that supplies the PWM control signal to the gate of the switching element; and
      a temperature variation detecting section that detects a variation in temperature on the basis of the temperature detected by the thermo-sensor,
   wherein the gate drive section supplies the PWM control signal with the low duty ratio when the temperature variation detecting section detects that the variation in temperature per unit time is greater than a threshold value; and
   wherein the gate drive section supplies the PWM control signal with the regular duty ratio when the voltage measuring section measures the variation in voltage of the motor.

3. The control device according to claim 2, wherein the gate driving section stops to supply the PWM control signal with the low duty ratio when the temperature variation detection section detects that the variation in temperature is greater than a first predetermined value; and
   wherein the gate driving section resumes to supply the PWM control signal with the low duty ratio when the temperature variation detection section detects that the variation in temperature is lowered to a second predetermined value lower than the first predetermined value.

4. A control device for controlling a recovery from a locking of a first motor and a second motor, comprising:
   a first switching unit which supplies a motor current from a current supplying unit to the first motor and the second motor on the basis of a PWM control signal;
   a second switching unit which turns on/off the first motor and the second motor on the basis of an ON/OFF signal;
   an overheating interrupting unit which detects a temperature of the second switching unit to output the OFF signal for turning off the first motor and the second motor when the detected temperature is greater than a predetermined value; and
   a driving control unit which supplies the PWM control signal to control a driving of the first switching unit and supplies the ON/OFF signal to control a driving of the second switching unit, and supplies the OFF signal to the second switching unit when receiving the OFF signal from the overheating interrupting unit,
   wherein the driving control unit supplies the PWM control signal with a low duty ratio lower than a regular duty ratio to the first switching unit when at least one of the locking of the first motor and the second motor is detected depending on a variation in temperature of the first switching unit; and
   wherein the driving control unit supplies the PWM control signal with the regular duty ratio to the first switching unit when a cancel of the locking of the at least one of the first motor and the second motor is detected depending on a variation in inter-terminal voltage of the at least one of the first motor and the second motor.

5. The control device according to claim 4, wherein the first switching unit includes:
- a first switching element that is turned on/off in response to the PWM control signal and that supplies the motor current; and
- a first thermo-sensor that detects a temperature of the first switching unit, wherein the second switching unit includes:
- a second switching element that is turned on/off in response to the ON/OFF signal and that turns off the first motor and the second motor when turned off; and
- a second thermo-sensor that detects a temperature of the second switching unit, wherein the driving control unit includes:
- a voltage measuring section that measures inter-terminal voltages of the first motor and the second motor;
- a gate drive section that supplies the PWM control signal to the gate of the first switching element and the ON/OFF signal to the second switching element; and
- a temperature variation detecting section that detects a variation in temperature on the basis of the temperature detected by the first thermo-sensor, and wherein the gate drive section supplies the PWM control signal with the low duty ratio when the temperature variation detecting section detects that the variation in temperature per unit time is greater than a threshold value; and wherein the gate drive section supplies the PWM control signal with the regular duty ratio when the voltage measuring section measures the variation in voltage of at least one of the first motor and the second motor.

6. The control device according to claim 5, wherein the gate driving section stops to supply the PWM control signal with the low duty ratio when the temperature variation detection section detects that the variation in the temperature detected by the first thermo-sensor is greater than a first predetermined value; and wherein the gate driving section resumes to supply the PWM control signal with the low duty ratio when the temperature variation detection section detects that the variation in the temperature detected by the first thermo-sensor is lowered to a second predetermined value lower than the first predetermined value.

7. A control method of controlling a recovery from a locking of a motor, the control method comprising:
- supplying a motor current from a current supplying unit to the motor via a switching unit;
- supplying a PWM control signal to the switching unit to control a driving of the switching unit;
- supplying the PWM control signal with a low duty ratio lower than a regular duty ratio to the switching unit when the locking of the motor is detected depending on a variation in temperature of the switching unit; and
- supplying the PWM control signal in the regular duty ratio to the switching unit when a cancel of the locking of the motor is detected depending on a variation in inter-terminal voltage of the motor.

8. The control method according to claim 7, wherein the supplying process of the motor current is performed by a switching element in accordance with the PWM control signal, the control method, further comprising:
- detecting a temperature of the switching unit;
- measuring an inter-terminal voltage of the motor;
- supplying the PWM control signal to the gate of the switching element;
- detecting a variation in temperature on the basis of the temperature detected in the detecting process of the temperature;
- supplying the PWM control signal in the low duty ratio when it is detected that the variation in temperature per unit time is greater than a threshold value; and
- supplying the PWM control signal in the regular duty ratio when the variation in voltage of the motor is detected.

9. The control method according to claim 8, further comprising:
- stopping the supply of the PWM control signal in the low duty ratio when the variation in the temperature is greater than a first predetermined value; and
- resuming the supply of the PWM control signal in the low duty ratio when the variation in the temperature is lowered to a second predetermined value lower than the first predetermined value.

10. A control method of controlling a recovery from a locking of a first motor and a second motor, the control method comprising:
- supplying a motor current from a current supplying unit to the first motor and the second motor on the basis of a PWM control signal via a first switching unit;
- turning on/off the first motor and the second motor on the basis of an ON/OFF signal via a second switching unit;
- detecting a temperature of the second switching unit;
- outputting a signal for turning off the first motor and the second motor when the detected temperature of the second switching unit is greater than a predetermined value;
- controlling the driving of the first switching unit in response to the PWM control signal;
- controlling the driving of the second switching unit in response to the ON/OFF signal;
- supplying the OFF signal to the second switching unit when the OFF signal is received;
- supplying the PWM control signal in a low duty ratio lower than a regular duty ratio to the first switching unit when the locking of at least one of the first motor and the second motor is detected depending on a variation in temperature of the first switching unit; and
- supplying the PWM control signal in the regular duty ratio to the first switching unit when a cancel of the locking of the at least one of the first motor and the second motor is detected depending on a variation in inter-terminal voltage of at least one of the first motor and the second motor.

11. The control method according to claim 10, wherein the supplying process of the motor current is performed by a first switching element turned on/off in accordance with the PWM control signal; and wherein the turning on/off process of the first motor and the second motor is performed by a second switching element turned on/off in accordance with the ON/OFF signal, the control method, further comprising:
- detecting a temperature of the first switching unit;
- detecting a temperature of the second switching unit,
- measuring inter-terminal voltages of the first motor and the second motor;
- supplying the PWM control signal to the gate of the first switching element;

supplying the ON/OFF signal to the second switching element;

detecting a variation in the temperature of the first switching unit;

supplying the PWM control signal in the low duty ratio when it is detected that the variation in the inner temperature per unit time is greater than a threshold value; and supplying the PWM control signal in the regular duty ratio when the variation in voltage of at least one of the first motor and the second motor is detected.

12. The control method according to claim 11, further comprising:

stopping the supply of the PWM control signal of the low duty ratio when the variation in the temperature of the first switching unit is greater than a first predetermined value; and resuming the supply of the PWM control signal of the low duty ratio when the variation in the temperature of the first switching unit is lowered to a second predetermined value lower than the first predetermined value.

* * * * *